United States Patent
van Vliembergen et al.

[19]

[11] Patent Number: 6,088,118
[45] Date of Patent: *Jul. 11, 2000

[54] IMAGE REPRODUCTION SYSTEM AND METHOD WITH IMAGE GENERATOR MALFUNCTION RECOVERY

[75] Inventors: Eduardus J. W. van Vliembergen; Jurek Nikolaj Deen, both of Venlo, Netherlands

[73] Assignee: Océ-Technologies B.V., Venlo, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,463

[22] Filed: Jul. 18, 1996

[30] Foreign Application Priority Data

Jul. 19, 1995 [NL] Netherlands .......................... 1000841

[51] Int. Cl.$^7$ ...................................................... H04N 1/32
[52] U.S. Cl. ......................... 358/1.14; 358/444; 358/468
[58] Field of Search ..................................... 358/404, 442, 358/444, 468, 1.15–1.17, 1.14; 395/114–116, 113; 399/87; H04N 1/32

[56] References Cited

U.S. PATENT DOCUMENTS

| | | | |
|---|---|---|---|
| 5,075,782 | 12/1991 | Tufano et al. . | |
| 5,103,318 | 4/1992 | Takaoka | 358/437 |
| 5,148,286 | 9/1992 | Knodt et al. | 358/437 |
| 5,170,397 | 12/1992 | Hurtz et al. . | |
| 5,365,349 | 11/1994 | Knodt et al. | 358/444 |
| 5,467,449 | 11/1995 | Gauronski et al. . | |
| 5,511,150 | 4/1996 | Beaudet et al. | 395/113 |
| 5,537,218 | 7/1996 | Negi | 358/404 |
| 5,543,938 | 8/1996 | Fukushima | 358/404 |
| 5,586,228 | 12/1996 | Tokishige et al. | 395/115 |
| 5,664,074 | 9/1997 | Kageyama et al. | 395/115 |
| 5,668,938 | 9/1997 | Tomory | 395/115 |
| 5,825,989 | 10/1998 | Sonty et al. | 358/1.14 |

FOREIGN PATENT DOCUMENTS

| | | |
|---|---|---|
| 0 478 355 | 4/1992 | European Pat. Off. . |
| 91/05432 | 4/1991 | WIPO . |

*Primary Examiner*—Kim Yen Vu

[57] ABSTRACT

An image reproduction system and method for reproducing images on a support material. The system is provided with at least one image generator for generating images for reproduction, at least one electronic memory in which a set of images can be stored, a printing system for printing images stored in the memory on the support material. In response to a malfunction in the image generator, a control unit or control method provides the following control:

the images of complete sets stored in the memory at the time of the malfunction are printed by the printing system the predetermined number of times and in the predetermined sequence; and images stored in the memory at the time of the malfunction are not printed if these images belong to incomplete sets stored in the memory which were being generated at the time of the image generator malfunction.

22 Claims, 4 Drawing Sheets

IMAGE REPRODUCTION SYSTEM AND METHOD WITH IMAGE GENERATOR MALFUNCTION RECOVERY

BACKGROUND OF THE INVENTION

1. Technical Field of the Invention

The invention relates to an image reproduction system and method for the reproduction of images on a support material. More particularly, the invention relates to a method for controlling the operation of an image generator, a memory and a printer together constituting an image reproduction system.

2. Description of Related Art

A related system is known, inter alia, from U.S. Pat. No. 5,075,782. A set of images which is to be reproduced a predetermined number of times in a predetermined sequence is termed a "job" in the '782 patent. The memory operates as a buffer between the image generator and the printing system so that the image generator and the printing system can in principle operate independently of one another. This means that the printing system can continue to operate in the event that the image generator malfunctions, and vice versa. If a malfunction occurs in the image generator, the printing system continues to operate until it is ready to print an image not yet stored in the memory.

This means that in the system according to the '782 patent cited above, all the images already stored in the memory are still printed in the event of a malfunction in the image generator. Even if the malfunction occurs during the printing of a set of images and the image generator is still generating image information for that set at the time of the malfunction, the images already generated and stored in the memory will still be printed.

A disadvantage of the '782 system is that it is completely uncertain whether the rest of the set that is not yet completely printed will be printed after the malfunction has been remedied. Even though the job recovery procedure of the apparatus enables the user to print the remainder of set after the malfunction has been remedied, because of the image generator malfunction the integrity of the remainder of the set is questionable at best. In practice, the images already printed are frequently discarded, particularly if the malfunction is serious and of a long duration. One reason for this is that the user is not always prepared to wait until the malfunction has been remedied before the set is printed. If, after the malfunction has been remedied, a user were to have the remaining part of the set printed the selected number of times and in the predetermined sequence, he would also have to check whether the images printed respectively before and after the malfunction are in agreement with the selected number and the predetermined sequence in which the images of the set in question should have been printed. That is another reason for a user to completely reprint the entire set and discard the part of the set already printed before the malfunction. The result is a considerable waste of support material, usually sheets of paper. The amount of support material discarded can be fairly large, particularly if the memory has a considerable storage capacity, the set is large and/or the number of times that the set is to be printed is large.

An object of the invention is to prevent wasting support material in the event of a malfunction in the image generator. Another object is to provide a method and apparatus that controls a printing system to prevent wasting a support material when an image generator malfunctions.

SUMMARY OF THE INVENTION

The image reproduction system according to the invention avoids these disadvantages.

An object of the invention is to prevent wasting support material used in a printing system in the event of a malfunction in the image generator.

Another object of the invention is to provide a control unit which, in response to a malfunction in the image generator, controls the image reproduction system such that:

the images of complete sets stored in the memory at the time of the malfunction are printed by the printing system on the support material the selected number of times in the predetermined sequence; and images stored in the memory at the time of the malfunction are not printed if said images belong to incomplete sets stored in the memory and in connection with which image information was still being generated by the image generator at the time of the malfunction.

Since, in the event of a malfunction in the image generator, the complete sets possibly stored in the memory are simply printed the selected number of times in the predetermined sequence, the user will encounter no unnecessary disturbance from the malfunction.

If, for example, the printing system is printing a set other than the set being processed by the image-generating apparatus when the malfunction occurred, all the complete sets already stored in the memory will be printed. The set being generated by the image generator at the time of the malfunction will not be printed. Consequently, the invention prevents support material from being discarded unnecessarily.

If the printing system is printing a set of images which is still being generated by the image generator at the time of the malfunction, the set in the memory will be incomplete. The inventive printing system will stop printing such incomplete sets. This prevents images from being printed and subsequently discarded.

In practice, the printing system will not immediately stop printing these images so quickly. This means that images in connection with which the printing process has already started in the printing system and which belong to the set in connection with which the image generator was still generating image information at the time of the malfunction will be printed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
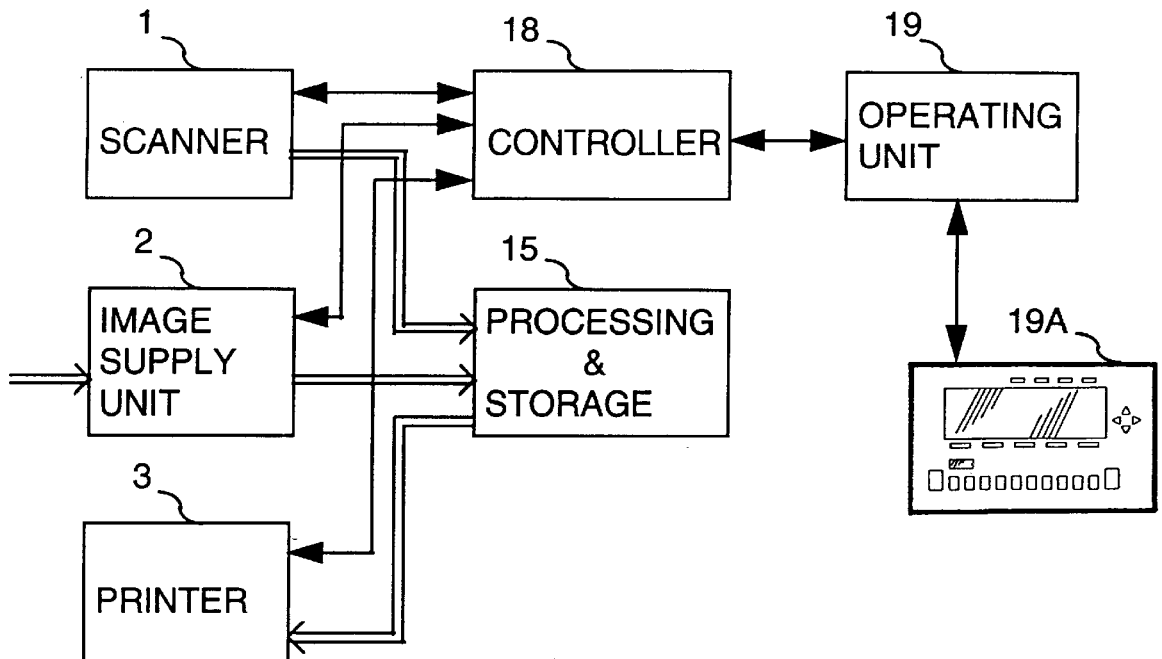
FIG. 1 shows the general layout of a system according to the invention.

FIG. 1 shows the general layout of an image reproduction system according to the invention. This system includes a first image generator consisting of a scanner 1 for opto-electrical scanning of a document and delivering digital image information corresponding thereto, a second image generator having an image supply system 2 for inputting digital image signals from an external source, and a printing unit 3 for printing digital image information on a support material.

Both the scanner 1 and the image supply system 2 are connected to a processing and storage system 15 for processing and intermediate storage of image information. The processing and storage system 15 is also connected to the printing unit 3. Scanner 1, image supply system 2, processing and storage system 15 and printing unit 3 are connected to a central control unit 18, which is also connected to an operating unit 19 provided with an operating panel 19A having operating elements and a display screen for use by an operator.

Figure 2:
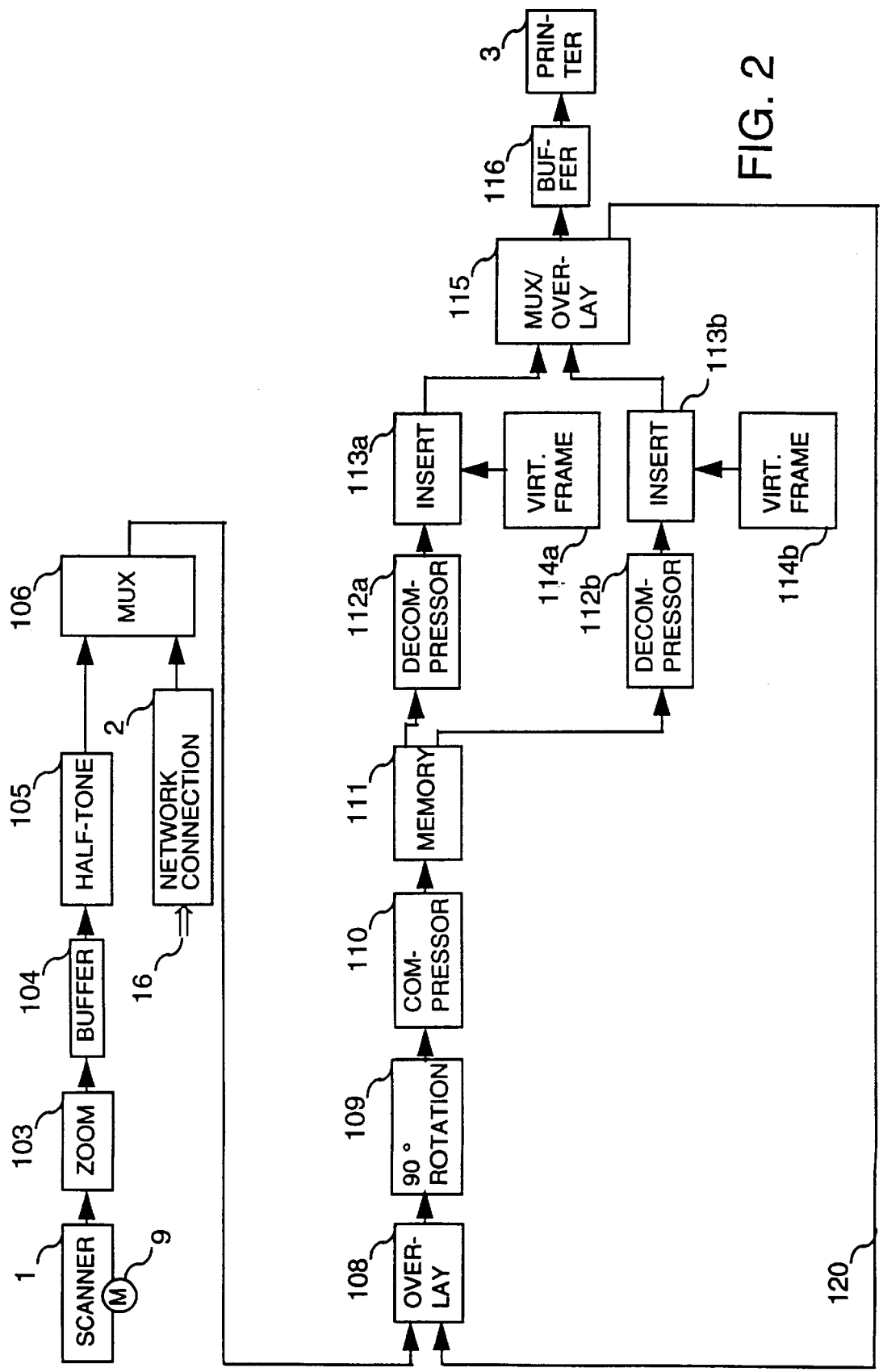
FIG. 2 is a diagram showing the construction of a system for processing and intermediate storage of image information for use in the system shown in FIG. 1.

FIG. 2 is a diagrammatic illustration of a system 15 for processing and intermediate storage of image information. The rectangles in FIG. 2 denote functional modules (both physical apparatus components and/or software modules) and the arrows indicate the data flow from one module to the next. The scanner 1, supply system 2 and printing unit 3 are shown in this Figure in order to illustrate their positional relationship with respect to the system 15. Although not shown in FIG. 2, the various elements of the system 15 are connected to the control unit 18, which coordinates their operation.

The scanner 1 scans an original document line by line and in so doing delivers digital information in the form of, for example, digital signals descriptive of the grey values of raster dots (pixels) of the document. The scanner element (CCD array) and document are moved relative to one another by a motor 9. Motor 9 can be, for example, a servomotor with a feedback circuit for the position of the scanner element. A more detailed description of the scanner will be given hereinafter with reference to FIG. 3.

The digital signals from the scanner are fed to a ZOOM module 103 which, if required, provides enlargement or reduction by, for example, interpolation and subsampling, respectively.

The signals from the ZOOM module 103 are fed via a buffer 104 to a half-tone module 105, which converts the grey value signals into binary signals which specify one of two values for each pixel: zero or one, so that these signals are suitable for controlling a printing unit which can print only white or black image dots. Numerous half-tone processing operations are described in the literature so that no explanation is necessary here. It is immaterial to this description which half-tone process is applied provided the resulting signals are of a binary type.

The signals from the half-tone module 105 are in turn fed to a multiplexer 106. The image supply system 2 for digital image signals from a local network 16 is connected to another input of multiplexer 106 so that digital signals can be supplied from an external source, such as a workstation. The multiplexer 106 passes one of two data streams (from the scanner 1 or from the network 16) to a mixing module 108. The mixing module 108 has a second input to which a return line 120 is connected for returning signals from the memory 111, as further described hereinafter.

The signals from multiplexer 106 and return line 120 can be mixed in mixing module 108 in accordance with logical functions on a pixel basis, corresponding to mixing two images. Examples of such logic functions are: OR, AND, and EXOR. The mixing of binary signals in this way is generally known from the literature and requires no further explanation here.

The mixing module 108 is connected to a rotation module 109, in which the image defined by the signals from the mixing module 108 can be rotated through an angle of, for example, 90°.

The signals from rotation module 109 are then compressed in a compression module 110 and stored in a memory 111. Although compression is not strictly necessary, it is advisable because compression makes it possible to store the data of more documents in the same memory 111. The compression method can, for example, be run length coding. The memory 111 is provided with a management system (not shown) to update the addresses where the data of the documents are stored.

The memory 111 is constructed with two independent read-out lines, so that the image data of two documents can be read out simultaneously. These read-out lines are each connected to decompression modules 112a, 112b. Decompression modules 112a, 112b are connected to basically identical insertion modules 113a, 113b, respectively. These insertion modules 113a, 113b can combine the image signals with artificial image data corresponding to a blank (white) image delivered by a virtual frame module 114a, 114b which is also connected to insertion modules 113a, 113b. The purpose of this is to be able to construct image data descriptive of a larger image than the image data from the memory 111, e.g. an image which, in the case of the right-hand half, consists of a scanned document, while the left-hand half is blank (white).

The insertion modules 113a, 113b are connected to a mixer multiplexer 115, in which one of the image signals can be selectively passed or both images signals can be mixed, in the same way as described in connection with mixing module 108.

Mixing multiplexer 115 has two outputs: one is the return line 120 already referred to, which enables images to be mixed with newly supplied (scanned) images, and the other output is connected via a buffer memory 116 to the printing unit 3, which will be discussed in greater detail hereinafter.

Buffers may be provided at various points in the circuit described. Since, however, these are not relevant to the operating principle, they have been omitted from the description. A number of sets of images obtained on the basis of the image information can be stored in the memory 111. These are images which can be obtained either by the scanner 1 or by the network connection 16. Each set comprises a number of images which are required to be reproduced a predetermined number of times in the predetermined sequence. A set of images to be reproduced a predetermined number of times and in a predetermined sequence is also termed a "job". A set may also consist of just one image. In addition, the predetermined number of times that a set is to be reproduced may be equal to one. As already discussed, an image does not always have to involve the exact reproduction of a document. An image can also be the processed image of a document, part of an image of a document, the image of a number of documents, an image obtained from an external unit, and/or a combination of these images.

Figure 3:
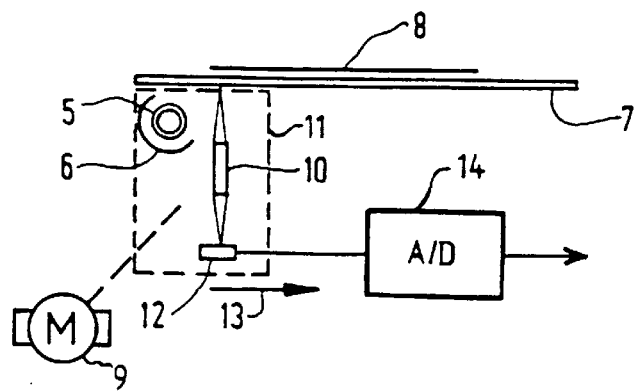
FIG. 3 shows a scanning system for use in the system shown in FIG. 1.

The scanner 1 is shown in greater detail in FIG. 3. Scanner 1 includes a tubular lamp 5 and a co-operating reflector 6, by which a narrow strip of a document 8 placed on a glass platen 7 is exposed. The scanner also comprises an array 10 of imaging glass fibers (e.g. a Selfoc lens array) by which the light reflected by the document is projected on a sensor array, e.g. a CCD array 12. The lamp 5, reflector 6, Selfoc lens array 10 and CCD 12 are mounted on a carriage 11 which, during scanning, is advanced by a servomotor 9 at a uniform speed in the direction of arrow 13 so that the document 8 is scanned line by line by the CCD array 12. The position of the carriage 11 is continually measured by a known apparatus and used, inter alia, in a feedback circuit to control servomotor 9.

In this way, each image dot of the document is converted to an analogue signal corresponding to the grey value of that dot. The analogue signal is then converted to a digital signal for each image dot by an A/D converter 14.

The scanner 1 can also be equipped with an automatic or semi-automatic document feed unit (not shown in the drawings). An automatic feed unit (ADF) includes a tray to receive a stack of documents for copying, a separating mechanism for taking the documents from the stack one by one and a transport mechanism for transporting a taken document to the platen 7. A semi-automatic or manual document feed unit (MDF) includes a transport mechanism whereby a document inserted by hand is fed to the platen 7. Such feed units are public knowledge so that no further description is necessary.

Figure 4:
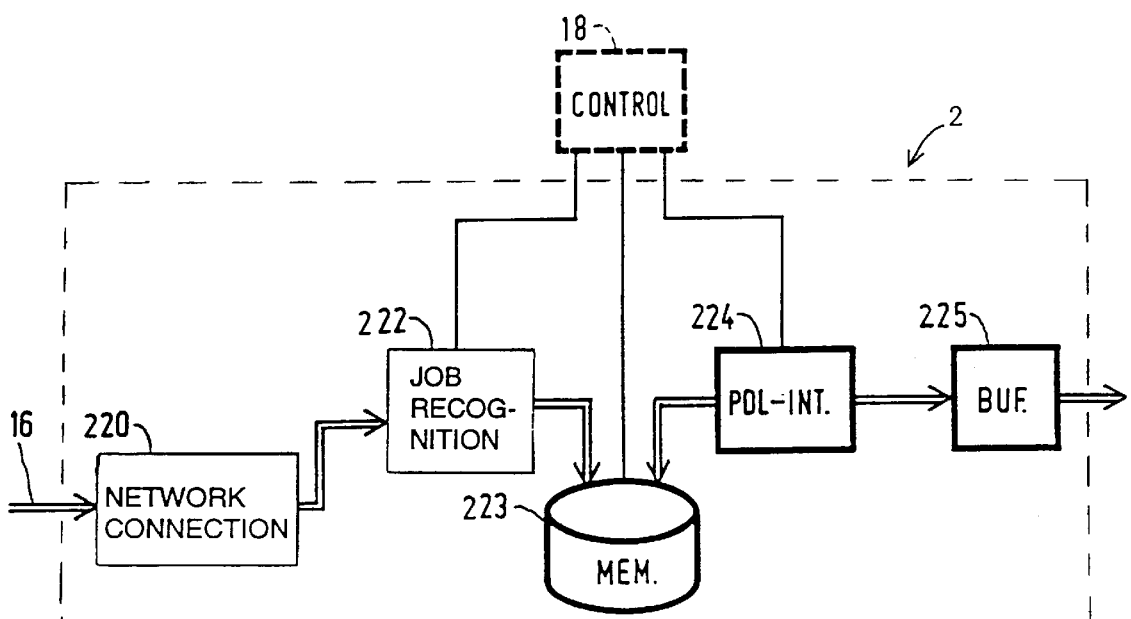
FIG. 4 shows the construction of a front-end for use in the system shown in FIG. 1.

The image supply system 2 for supplying digital image information from an external source, or a "front-end", is shown in FIG. 4. FIG. 4 shows a network connection unit 220 connected to an external network 16, to which a number of workstations can be connected. These workstations can send data files in various generally used formats (page description languages such as PCL, PostScript, etc) via network connection 16 for printing. The network technology and the sending of data files over networks is public knowledge and will therefore not be explained here.

The connection unit 220 is connected to a job recognition module 222 which is, in turn, connected to a memory 223 such as a hard disc. The job recognition module 222 determines, in respect to each data file supplied, the page description language (PDL) in which it is compiled and extracts identification data contained therein. Data files sent in network systems always have identification data. These identification data usually consist of the name of the sender (owner) of the file and the name of the file itself. These identification data are extracted by the job recognition module 222.

The memory 223, which is intended for interim storage of a data file supplied, is also connected to a PDL interpreter 224, for converting a data file coded in a page description language into a form suitable for processing by the printing unit 3. This process is generally termed "rasterising". The PDL interpreter 224 is connected via a buffer 225 to the processing and intermediate storage system 15. The job recognition module 222, memory 223 and PDL interpreter 224 are also each connected to the control unit 18.

The printing unit 3 will now be described with reference to FIG. 5. This system is provided with an endless photo-conductive belt 20 advanced at a uniform speed in the direction of arrow 24 by drive and guide rollers 21, 22 and 23.

The processed image data supplied from system 15 drives an LED array 25 in such a manner that the photoconductive belt 20 is exposed imagewise line-by-line after it has been electrostatically charged by a corona system 30.

The latent charge image formed by exposure on the photoconductive belt 20 is developed with toner powder by a magnetic brush system 31 to give a toner image which then, in a first transfer zone, is brought into contact under pressure with an endless intermediate medium belt 32 made of or covered with an elastic and heat-resistant material, e.g. silicone rubber. In these conditions, the toner image is transferred by adhesion forces from the belt 20 to the belt 32. After this image transfer, any toner powder residues are removed from the photoconductive belt 20 by a cleaning device 33, whereupon this belt 20 is ready for fresh use.

The intermediate medium belt 32 is trained over drive and guide rollers 34, 35 and heated to a temperature above the processing temperature of the toner powder, e.g. by an infrared radiator disposed inside roller 35. While the belt 32 with the toner image thereon is being advanced, the toner image becomes tacky as a result of the heating.

In a second transfer zone between the belt 32 and the pressure roller 36, the tacky toner image is transferred by pressure to, and simultaneously fixed on, a copy sheet supplied from one of the reservoirs 37 or 38.

The resulting copy can then be delivered in a tray 39 or be supplied by a deflecting element 40 (in the position indicated by broken lines) to a turn-over device 41 in which the copy sheet is turned over so that it is supplied again to the second transfer zone between the belt 32 and the pressure roller 36 for printing on the other side with a powder image in that transfer zone and then delivered in the tray 39.

Figure 5:
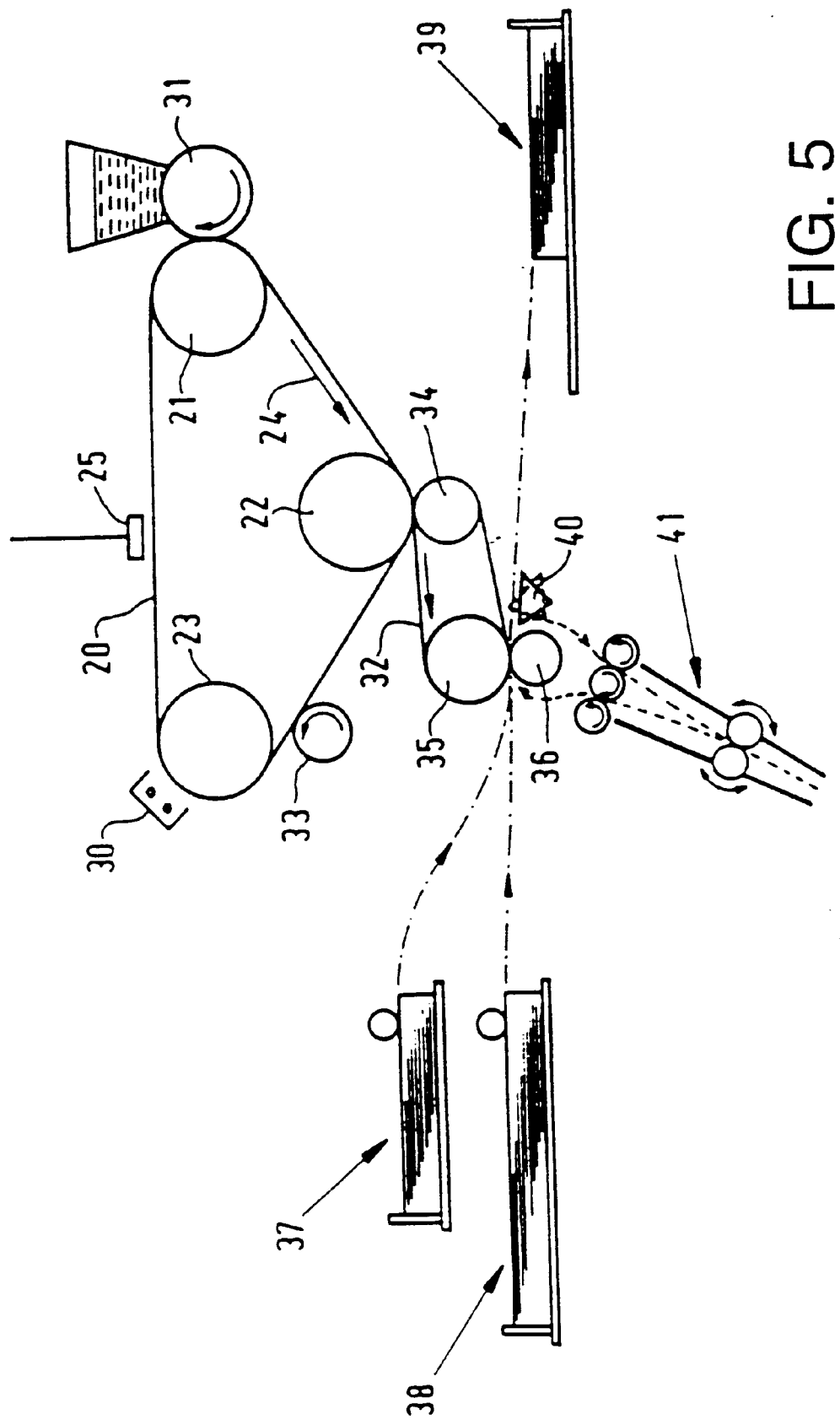
FIG. 5 shows the construction of a printing unit for use in the system shown in FIG. 1.

FIG. 5 shows only two copy sheet reservoirs 37 and 38, but, of course, the number of reservoirs can be extended to supply different formats of copy sheets (e.g. A5, A4 and A3, and also other, e.g. American, formats). In addition, it is necessary to be able to offer the various copy sheet formats in different orientations—i.e. longitudinal transit (with the longest peripheral side in the direction of transit) or transverse transit (with the shortest peripheral side in the transit direction), in order to be able to produce copies of one and the same copy sheet format but with the orientation of the image information being selectively in the direction of transit of the copy sheets through the printing unit or perpendicularly thereto.

The various components of the printing unit 3 are controlled by the central processing unit 18 directly or by sub-control modules.

The system operates as follows: the user places a stack of documents for reproduction in the automatic document feeder of the scanner 1. By means of the operating panel 19A the user can indicate the way in which he wants the documents processed. For example the user can indicate the number of copies and the copy sequence. Various image processing operations can also be input to the operating panel 19A. On the basis of the image information obtained by the scanner, at least one set of a number of images to be produced in a predetermined sequence a selected number of times is accordingly made by the processing and storage system 15. This set of images is stored in the memory (set memory) 111. Images can then be supplied from such a set to the printing unit 3 to enable the stored images to be printed on the support material. Similarly, using the operating panel 19A, a user can indicate that the image reproduction system is to be used as a printer. One or more data files from in the image supply system 2 can then be selected, whereupon these data files are read out the memory 223, processed by the PDL interpreter 224 and fed via the buffer 225 to the mixing module 108. The information thus supplied to the mixing module 108 can be further processed as discussed in connection with the scanner. Finally, on the basis of the image information obtained from the network, at least one set of images will be stored in the memory 111.

The memory 111 enables the printing unit 3, on the one hand, and the scanner 1, on the other hand, to operate independently of one another. This means, for example, that the printing unit 3 can continue to work in the event of a malfunction in the scanner 1. Alternatively, the scanner 1 can continue to work if there is a malfunction in the printing unit 3. In addition, it is possible for the printing unit 3 to continue to operate in the event of a malfunction in the image supply system 2 or the scanner 1 and vice versa.

The term "malfunction" in connection with the scanner 1 may mean, for example, a document jam in the automatic document feeder has occurred. Other types of malfunction are contemplated, e.g. a malfunction in the drive of the carriage 11, failure of the lamp 5, etc.

The control unit 18 is so arranged that in response to a malfunction in the scanner 1, it controls the image reproduction system so that only the images of complete sets stored in the memory 111 at the time of the malfunction are printed by the printing unit 3 the selected number of times and in the predetermined sequence. This means that a user will encounter the minimum disturbance from the malfunction in the scanner 1. Assuming that there is at least one complete set of images stored in the memory 111 and being printed at the time of the malfunction, the printing unit 3 will completely print this set. In other words, the at least one complete job already stored in the memory 111 is completely processed. Any other complete job stored in the memory 111 will also be printed. The printing unit 3 will stop after these complete jobs have been processed.

The incomplete set stored in the memory 111 at the time of the malfunction, and in respect of which image information was still being generated at the time of the malfunction, is not printed. Moreover, an incomplete set stored in the memory 111 which is still being generated by the image supply system 2 is printed in the event of scanner malfunction—obviously, this set can be completed in the usual way because there is no malfunction in the image supply system 2.

One advantage of the invention is that no support material, particularly sheets, will be discarded. If the incomplete job stored in the memory and in connection with which the scanner malfunction occurred is actually printed, there is a considerable risk that the user will discard these prints. The user frequently chooses to completely re-scan and print in one operation the entire set of documents in connection with which the malfunction occurred during scanning, even though the apparatus is provided with an error recovery procedure enabling him to resume the job stopped by the malfunction at the malfunction point. In practice, restarting the entire job is often preferred over checking whether the resumption was without errors.

Another situation arises if there is no single complete set stored in the memory 111. In that case, there is only an incomplete set of images stored in the memory 111 and at the time of the malfunction they are printed by the printing unit 3 and documents thereof are still being scanned by the scanner 1. At the time that the malfunction occurs, however, no further images of the incomplete set are supplied from the memory 111 to the printing unit 3. This means that the printing unit 3 stops printing as quickly as possible. The advantage of this is that if a user chooses to re-scan the complete set, only a minimum quantity of images already printed has to be discarded. If, however, the printing unit 3 were not stopped, the images of the incomplete set stored in the memory 111 would still all be printed, i.e. all the images completely scanned until the time of the malfunction.

If a malfunction occurs in the image supply system 2, the control unit controls he printing unit 3 in response to this malfunction as described in connection with the malfunction in the scanner 1. This means that the images of complete sets stored in the memory 111 at the time of the malfunction in the supply system 2 are printed by the printing unit 3 the predetermined number of times and in the predetermined sequence and images which are stored in the memory 111 at the time of the malfunction in the supply system 2 are not printed if these images belong to incomplete sets stored in the memory and in connection with which image information was still being generated at the time of the malfunction by the supply system 2. Since these conditions are completely similar to the description in relation to a malfunction in the scanner, no further explanation will be given here.

In the event of one or more jobs still being printed when the scanner 1 malfunctions, it may occur that the malfunction is so quickly remedied by the operator that the end of jobs still being processed is not reached. In that case, there would be no point in stopping the printer 3 when the end of the jobs still to be finished is reached. Consequently, after the malfunction in the scanner 1 has been remedied, the machine will continue to accept new jobs. The job in which the scanner malfunction occurred can, at the choice of the operator, either be resumed at the point of the malfunction, or be cancelled. In the later case, the images of the incomplete set of images belonging to that job will be erased from the memory 111, after which the scanner 1 is immediately ready for scanning in new jobs and for storing the images thereof in the memory 111.

It was stated above that in the case in question the printing unit is stopped as quickly as possible in the event of a malfunction in the scanner 1 or supply system 2. This means that the printing unit 3 does print images whose printing process has already started. If this were not the case, the powder image formed by exposure and development on the belt 20 would not be transferred to the belt 32. The result is that there would then be considerable toner powder left on the belt 20 and this would have to be removed from the belt 20 by the cleaning device 33 to enable the belt 20 to be prepared for re-use. In such cases, the cleaning device 33 would be subjected to unnecessarily heavy stress. In that case, it is preferable to transfer the image in question to the belt 32, whereupon belt 32 transfers the toner image to a copy sheet supplied from one of the reservoirs 37 or 38. A suitable criterion for stopping the printing unit 3 is that any charge image present on the belt 20 is to be printed and then the printing stopped.

As already stated, a malfunction can also occur in the printing unit 3. In response to such a malfunction, the control unit 18 controls the image reproduction system in such manner that the scanner 1 and/or the supply system 2 continue to work until the first of the following conditions is satisfied:

all images for reproduction are stored in the memory 111; or the memory 111 is full.

If all the images for reproduction are stored in the memory 111 and if the malfunction in the printing unit 3 is then remedied, the images can still be printed. If the memory 111 is full, printing of the images from the memory 111 can be continued after the malfunction has been remedied. This again gives room in the memory 111 and the control unit 18 will so control the scanner 1 and/or inputting system 2 that their operation can again continue and the memory 111 can again be filled with new images.

The invention is in no way limited to the above-described exemplified embodiment. For example, it is possible that the control unit 18, in response to the remedying of a malfunction in the printing unit when the memory 111 is full, will allow only the complete sets of images from the memory 111 to printed. Here too there is, of course, the possibility that the user will, in the event of a malfunction in the printing unit, choose to completely re-scan the set of documents which were scanned at the time that the scanner stopped working because the memory 111 was full.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reproduction system for the reproduction of images on a support material, comprising:

first image generating means for generating a set of images to be reproduced a selected number of times and in a predetermined sequence;

memory means for storing the set of images generated by said first image generating means;

printing means for printing a queue including the set of images stored in said memory means on the support material; and control means for controlling said first image generating means, said memory means and said printing means, such that, when said first image generating means malfunctions during generating a set of images and said printing means is simultaneously printing images of that same set, said control means substantially immediately stops said printing means printing images of that same set, and when said first image generating means malfunctions during generating the set of images and said printing means is simultaneously printing images of another set of the queue, if the malfunction of said first image generating means is corrected and generating of images is resumed while said printing means is still printing images of another set of the queue, said control means, at a selection of an operator:

either stops said printing means when it is about to start printing images of the faulted set, or said control means controls said printing means to start printing images of the faulted set, even if this set is still in the process of being generated by said first image generating means.

2. The image reproduction system according to claim 1, wherein said control means controls said printing means for continuing printing sets of images already completely stored in the memory at the time of the malfunction, but stops the printing means when it is about to start printing images of said set which was being generated at the time of the malfunction.

3. The image reproduction system according to claim 1, said control means controlling said first image generating means, said memory means and said printing means when said first image generating means malfunctions such that an image stored in said memory means at the time of the malfunction is printed even though the image belongs to an incomplete set which was still in the process of being generated by said first image generating means at the time of the malfunction if a printing process in said printing means had already started for that image at the time of the malfunction.

4. The image reproduction system according to claim 1, said control means controlling said first image generating means and said memory means when said printing means malfunctions such that said first image generating means continues to generate images until the first of the following conditions is satisfied:

said first image generating means finishes generating the set of images and storing it in said memory means; or said memory means is full.

5. The image reproduction system according claim 1, said first image generating means including a scanning system for scanning documents and for generating images representing the scanned documents.

6. The image reproduction system according to claim 1, said first image generating means including an image supply system to which images can be supplied from an external source.

7. The image reproduction system according to claim 5, further comprising second image generating means including an image supply system to which images can be supplied from an external source.

8. The image reproduction system according to claim 7, said control means controlling said first image generating means, said second image generating means, said memory means and said printing means when said first image generating means malfunctions such that complete and incomplete sets of images from said second image generating means are printed by said printing means.

9. The image reproduction system according to claim 1, further comprising image processing means for processing the images generated by said first image generating means.

10. The image reproduction system according to claim 7, further comprising image processing means for processing the images generated by said first image generating means and for processing said second image generating means.

11. The image reproduction system according to claim 1, wherein said control means deletes the incomplete set from said memory means in response to a command from a user.

12. An image reproduction method for the reproduction of images on a support material, comprising the steps of:

a first generating step for generating a set of images to be reproduced a selected number of times and in a predetermined sequence, using a first image generator;

storing the images of the set generated by said first generating step in a memory;

printing a queue including the set of images stored by said storing step on the support material with a printer; and controlling said printing step such that, when said first image generating means malfunctions during generating a set of images and said printer is simultaneously printing images of that same set, said printer is stopped printing images of that same set substantially immediately, and when said first image generating step malfunctions during generating the set of images and said printing step is simultaneously printing images of another set of the queue, if the malfunction of said first image generating step is corrected and generating of images is resumed while said printing step is still printing images of another set of the queue, said control step, at a selection of an operator:
   either stops said printing step when it is about to start printing images of the faulted set,
   or said control step controls said printing step to start printing images of the faulted set, even if this set is still in the process of being generated by said first image generating step.

13. The image reproduction method according to claim 12, wherein said controlling step controls said printing step for continuing printing sets of images already completely stored in the memory at the time of the malfunction, but stops the printer when it is about to start printing images of said set which was being generated at the time of the malfunction.

14. The image reproduction method according to claim 12, said control step controlling said printing step when the first image generator malfunctions such that an image stored by said storing step at the time of the malfunction is printed even though the image belongs to an incomplete set which was still in the process of being generated by said first generating step at the time of the malfunction if said printing step had already started a printing process for that image at the time of the malfunction.

15. The image reproduction method according to claim 12, said control step controlling said first generating step and said storing step when the printer malfunctions such that said first generating step continues to generate images until the first of the following conditions is satisfied:
   said first generating step finishes generating the set of images; or
   the memory is full.

16. The image reproduction method according claim 12, said first generating step including a scanning step for scanning documents and for generating images representing the scanned documents.

17. The image reproduction method according to claim 12, said first generating step including a supply step for supplying images from an external source.

18. The image reproduction method according to claim 16, further comprising a second image generating step for generating images including a supply step for supplying images from an external source.

19. The image reproduction method according to claim 18, said control step controlling said first image generating step, said second image generating step, said storing step and said printing step when the first image generator malfunctions such that complete and incomplete sets of images from said second image generating step are printed by said printing step.

20. The image reproduction method according to claim 12, further comprising the step of processing images generated by said first image generating step.

21. The image reproduction method according to claim 18, further comprising the step of processing images generated by said first image generating step and said second image generating step.

22. The image reproduction method according to claim 12, wherein said control step deletes the incomplete set from the memory in response to a command from a user.

* * * * *